United States Patent [19]
Govoruhk

[11] 3,799,119
[45] Mar. 26, 1974

[54] METHOD FOR REMOVING BOT FLY EGGS FROM HORSES

[76] Inventor: Nicholas J. Govoruhk, 2329 Harford Rd., Baltimore, Md. 21218

[22] Filed: Jan. 10, 1973

[21] Appl. No.: 322,472

[52] U.S. Cl.................. 119/157, 424/350, 424/355
[51] Int. Cl....................... A01k 29/00, A61k 27/00
[58] Field of Search ............ 424/350, 355; 119/157

[56] References Cited
OTHER PUBLICATIONS

Merck Index–Seventh Edition, (1960), pages 789 & 1059.
Hutyra et al., Special Path & Therapeutics, (1938), pages 261 & 262.

Primary Examiner—Sam Rosen
Attorney, Agent, or Firm—Fidelman, Wolffe, Leitner & Hiney

[57] ABSTRACT

A method is provided whereby bot fly eggs are removed from the coat and skin of horses, preventing parasitic internal infestation with bot larvae and the undesirable and debilitating effects thereof. The animal is treated by applying a mixture of mineral spirits and 1,1,1-trichloroethane to the skin and coat of the animal and thereafter rubbing with a mildly abrasive material. The treatment is exceptionally effective for the removal of the eggs which are not readily susceptible to other techniques. Removal of the eggs eliminates the principal source of bot larvae infestation of horses.

3 Claims, No Drawings

METHOD FOR REMOVING BOT FLY EGGS FROM HORSES

The present invention relates to the treatment of horses. More particularly, it relates to a prophylactic treatment of horses with bot fly larvae. Still more particularly, the present invention relates to a simple, effective technique for the removal of bot fly eggs from the skin and hair of horses. In addition, the present invention relates to a procedure for the removal of bot fly eggs from the coat of horses which is safe and inexpensive and can be readily and rapidly employed by unskilled personnel during normal grooming and currying of such animals.

In the normal life cycle of the bot fly, eggs are frequently laid on the skin of horses. The eggs are deposited among the hairs of the animal's coat and are adhesively bonded in place with a mucous based excretion of the fly. Once emplaced, the eggs are incubated by the animal's body heat and, in due course, hatch. During the latter stages of the gestation of the eggs, the adhesive mucin causes a mild irritation of the horse's skin which induces the animal to lick the infested area. The moisture and friction of the licking cause the eggs to hatch and the larvae burrow into the animal's mucous membranes which surface the lips, tongue and the interior of the animal's mouth. The larvae gradually migrate to the stomach where they attach to the mucous membranes. There they complete the larval stage of their life cycle — to the detriment of their equine host. The attachment of the larvae causes permanent damage to the stomach wall and the pests compete with the host for nutrients. Unless prevented, considerable damage to the host can result. In extreme cases, this damage may terminate in death. In other milder cases, it may debilitate the animal. While the horse can be treated by periodic worming, such procedures do not prevent considerable damage from occurring.

Upon completion of the larval stage, the parasites pass out of the animal in the feces and the pupal stage is commenced. The pupae develop into mature flys and the cycle is repeated when new eggs are deposited on the host. In the normal life cycle, the gestation period of the eggs is about seven to 14 days. Once the larvae have hatched and burrowed into the host, a period of about three to 4 weeks is spent in transit to the mucosa of the stomach and intestines where the parasites remain for about 10 to 12 months. The pupal stage is about 3 to 5 weeks duration, followed by the emergence of the sexually mature fly, ready to reimitate the cycle. It is readily apparent that the greater part of the bot fly life cycle is spent parasitically in the larval stage to the detriment of the host animal.

The desirability of an effective prophylactic treatment to interrupt the entry of the bot fly larvae into the host and interrupt the normal life cycle is beyond question. The benefits of prophylaxis to the host animals, and consequently to their breeders and owners, would be considerable. It is accordingly an object of the present invention to provide a prophylactic treatment of horses to prevent or substantially reduce infestation of the animals with bot fly larvae.

A further object is to provide a technique for such treatment which is safe, both for horses and those who administer the treatment.

A still further object of the present invention is to provide a technique for prophylaxis of bot fly larvae infestation of horses which is simple and can be performed by unskilled workers without special training, expertise, or licensing.

Still another object is to provide such a technique which is rapid and inexpensive and which can be regularly and routinely employed without undue burden.

An additional object is to provide a technique which does not interfere with the normal practices of husbandry and training and which is compatible with normal care and handling.

Another object of this invention is to provide a technique without undesirable side-effects and which produces no trauma or reactions.

These and still other objects, which will become apparent from the following disclosure, are attained by the present invention which provides a method for effective, safe, simple, rapid and inexpensive removal of bot fly eggs from the coat of horses without undesirable side effects and which is fully compatible with ordinary and usual handling and care of the animals.

Bot fly eggs deposited, together with their natural adhesive binder, are extremely refractory to attempts at their removal by methods known to the prior art. It has now been found that the eggs are effectively removed by treating them and their adhesive binder with a mixture of mineral spirits and 1,1,1-trichloroethane, followed by rubbing down the horse with an abrasive material, such as 50-grit emery cloth. The aforesaid mixture will contain about 1 to 10 weight percent of the mineral spirits component and, correspondingly, 99 to 90 weight percent of the 1,1,1-trichloroethane. Preferably, the mixture will be about 3 weight percent mineral spirits and about 97 weight percent of the 1,1,1-trichloroethane. The mixture is applied to the coat of the horse, or to infested areas of the coat by any convenient technique such as, for example, aerosol spray, liquid spray, wiping the animal with a cloth or sponge wet with the mixture, pouring the mixture onto the animal, dipping the animal or the like. The amount of the mixture applied is not narrowly critical and it will ordinarily be sufficient if the amount applied serves to wet the animal's coat. After wetting the coat, the eggs can be readily removed by a mildly abrasive rubdown. Suitable abrasive media would include currying combs, brushes and the like, although superior performance is attained by the use of an emery cloth of about 50-grit, which is accordingly preferred.

It is not intended to limit the present invention by any theory or opinion concerning the mode of operation of the method, but it is believed that the adhesive bond of the mucinogenous binder to the animal's hair and skin is broken by the 1,1,1-trichloroethane, which has a considerable solvent action upon the adhesive binder. It is believed further that once the adhesive bond is broken, the eggs are no longer adherent and hence are relatively easy to remove by simple mechanical abrasion. It appears that the mineral spirits serve to reduce the volatility of the 1,1,1-trichloroethane to an effective degree.

Because the incubation period of the eggs ranges from about 7 to 14 days, weekly treatment in accordance with the present invention will provide substantially complete protection.

The operation of the method of the present invention and the best mode contemplated for the practice thereof is illustrated by the following example which is intended to provide guidance for those of ordinary skill

EXAMPLE

A mixture was formed of 97 parts by weight of 1,1,1-trichloroethane and three parts by weight mineral spirits. The mixture was rubbed onto the coat of a horse having substantial numbers of bot fly eggs deposited thereon. The mixture was applied by soaking an absorbent cloth with the fluid and thereafter briskly rubbing the fluid into the animal's coat. After the fluid mixture was applied, the horse was rubbed down with an emery cloth (50-grit). A careful examination of the hair and skin indicated complete removal of the eggs.

What is claimed:

1. The method of treating domestic animals to remove bot fly eggs from the animal's coat and skin whereby parasitic infestation with bot larvae is prevented comprising applying to the skin and coat of said animals in areas where bot fly eggs are deposited a mixture of about 1 to 10 weight percent mineral spirits and 99 to 90 weight percent 1,1,1-trichloroethane and thereafter rubbing the skin and coat with an abrasive appliance selected from the group consisting of currying combs, brushes, and emery cloth to remove said eggs.

2. The method of claim 1 wherein said abrasive appliance is a grade 50 emery cloth.

3. The method of claim 1 wherein said mixture contains 3 percent by weight mineral spirits and 97 percent by weight 1,1,1-trichloroethane.

* * * * *